April 9, 1935.  F. W. CUTLER  1,997,044
PROGRESSOR FOR A TRANSVERSE BRUSH FRUIT TREATING MACHINE
Filed Jan. 31, 1933  2 Sheets-Sheet 2
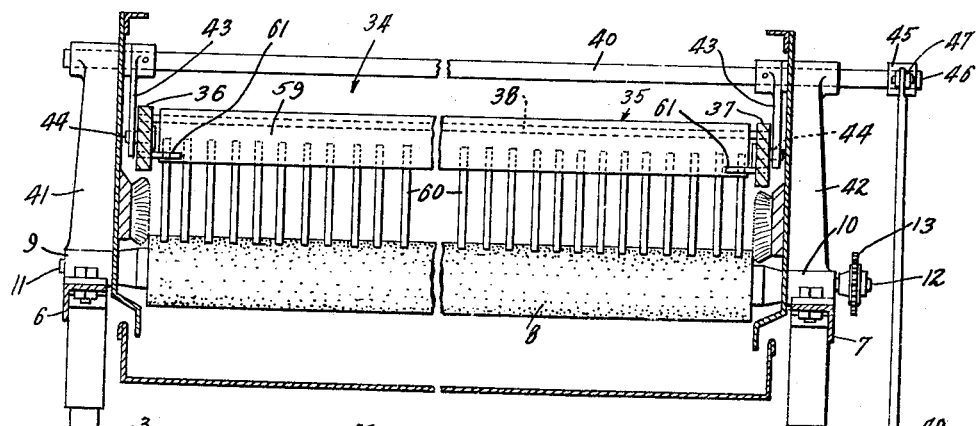
Fig. 2.
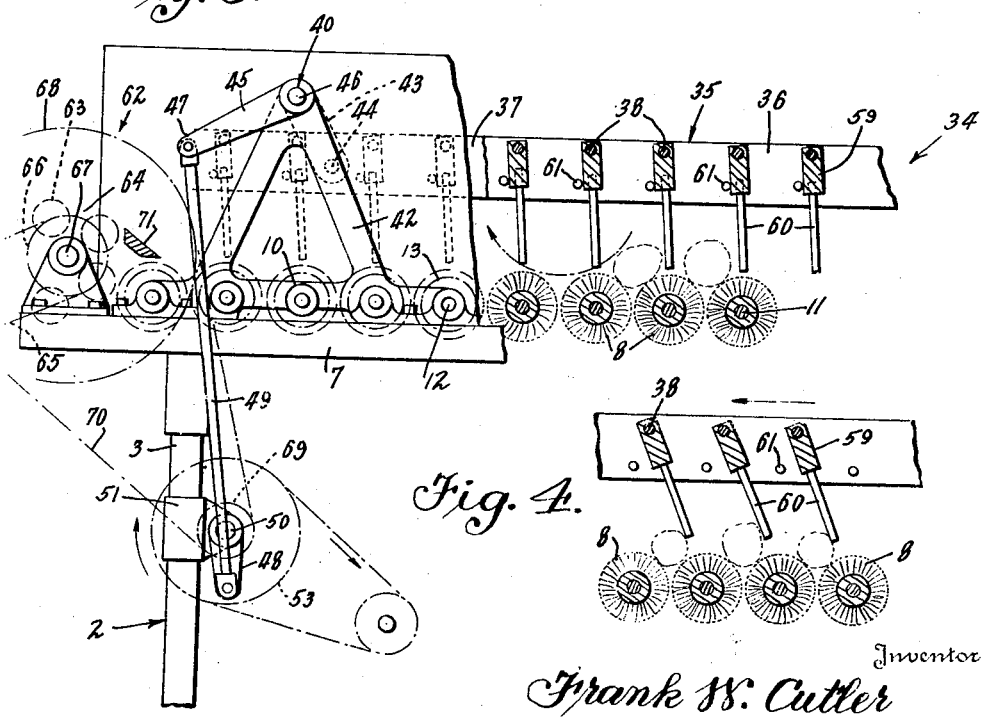
Fig. 3.
Fig. 4.
Inventor
Frank W. Cutler
By Lyon & Lyon
Attorneys Patented Apr. 9, 1935

1,997,044

UNITED STATES PATENT OFFICE 1,997,044

PROGRESSOR FOR A TRANSVERSE BRUSH FRUIT TREATING MACHINE

Frank W. Cutler, Portland, Oreg., assignor to Food Machinery Corporation, San Jose, Calif., a corporation of Delaware Application January 31, 1933, Serial No. 654,384

5 Claims. (Cl. 146—202)

This invention relates to a progressor mechanism to be applied to a fruit treating machine for progressing the fruit through the machine in an orderly fashion and at a predetermined rate of speed, so that all of the fruit will receive the same amount of treatment.

The ordinary fruit treating machine is usually provided with a plurality of cylindrical fruit treating brushes mounted transversely of the longitudinal axis of the machine in parallel relation, and all of the brushes are usually rotated in the same direction and at the same speed. The fruit being treated has usually been fed through the machine by the "displacement" method. In other words, the forward progress or passage of the fruit through the machine is caused by revolving all of the transverse brushes in one direction and by feeding the fruit continuously onto the top of the brushes, and as the top surface of all of the brushes is moving in the same direction, the fruit fed onto the brushes will be moved forward until it aligns itself in rows in the valleys or troughs formed between adjacent brushes. The fruit will remain in these valleys, rolling over and over, until additional fruit is fed into the machine, which fruit, being crowded forward, will displace and shove the lodged fruit forward into the next valley or trough, and so on until the fruit will have completed its course through the machine. Thus, the forward progress of the fruit depends solely upon the feeding of additional fruit to push the preceding fruit through the machine. It has been found that fruit progressed by the "displacement" method will tend to lag along the sides of the machine, and also that fruit of different sizes, intermingles and is not uniformly progressed through the machine, resulting in an over-treatment of some of the pieces of fruit and an insufficient treatment of other pieces.

It is an object of this invention to provide a progressor mechanism for a fruit treating machine, which will operate to positively and uniformly convey all of the fruit through the machine, whereby each piece of fruit, whether large or small, close to the machine sides or center, will receive the same amount of treatment while passing through the machine.

A further object is to provide a fruit treating machine with a progressor mechanism which will gently progress the fruit through the machine without bruising or injuring the fruit.

A further object is to provide a progressor mechanism which will travel along an arcuate path during its forward movement, whereby the fruit engaged by the progressor will be gently boosted or lifted into the next succeeding troughs.

A further object is to provide a progressor mechanism with resilient fruit engaging members.

A further object is to provide a progressor mechanism having a reciprocatory motion and having resilient fruit engaging members operative upon the forward stroke to engage and boost the fruit into the next succeeding troughs and said fruit engaging means arranged to exert a downward pressure upon the fruit during the back stroke of the progressor.

The fruit aligned in the troughs formed between the rotating brushes, is rotated by the brushes, and therefore the only brushing or abrading action received by the fruit is due to the "lag" in the speed of the fruit relative to that of the brushes.

A further object is to provide a progressor mechanism operative upon the back stroke thereof, for engaging the fruit to increase this "lag" in speed between the fruit and brushes, and also to exert a light pressure upon the fruit so as to materially increase the abrading action of the brushes.

A further object is to provide means which will yieldingly engage the fruit whether relatively large or small, to increase the "lag" and thereby the abrading action of the brushes.

A further object is to provide means for feeding the fruit onto the treating brushes in timed relation with the operation of the progressor means.

A further object is to provide means whereby the speed of the progressor and the fruit feeding means may be simultaneously changed without altering the speed of the treating brushes.

A further object is to provide means whereby the speed of the progressor and the fruit feeding means may be simultaneously changed to regulate the rate of travel of the fruit through the machine.

Other objects and advantages of the invention will become apparent as the nature of the same is more fully understood from the following description and accompanying drawings wherein is set forth what is now considered to be a preferred embodiment. It should be understood, however, that this particular embodiment of the invention is chosen principally for the purpose of exemplification, and that variations therefrom in details of construction or arrangement of parts, may accordingly be effected and yet remain within the spirit and scope of the invention as the same is set forth in the appended claims.

In the drawings:

Figure 2 illustrates a cross-sectional view taken substantially in the plane of line II—II of Fig. 1.

Figure 3 illustrates an enlarged, fragmental view partially in section of the rear side of the machine.

Figure 1:
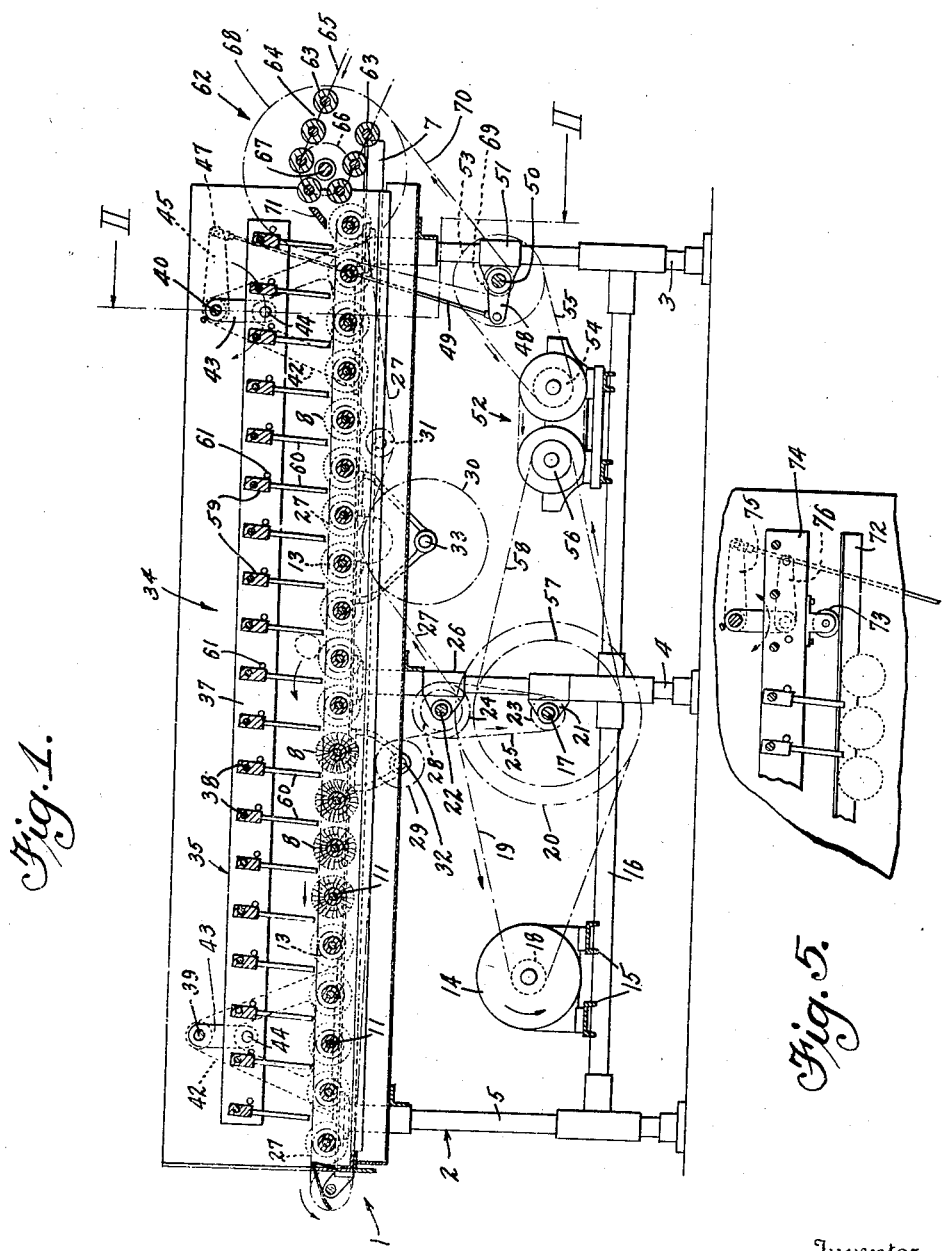
Figure 1 illustrates a side elevation of the invention partially in section.

And Figure 4 illustrates a fragment of Fig. 3 showing the fruit engaging fingers sliding back over the fruit.

Figure 5 illustrates a fragmental view showing a reciprocatory mounting for the cradle.

In the preferred embodiment of the invention as illustrated in the drawings, the fruit brushing or treating machine 1 may include a suitable frame 2 comprising three pairs of standards 3, 4 and 5 for supporting the side rails 6 and 7. A series of cylindrical fruit treating or abrading brushes 8 may be suitably journalled in bearings 9 and 10 which bearings may be suitably mounted upon their respective side rails 6 and 7. The fruit treating brushes may be in parallel relation and equally spaced along the side rails at distances sufficiently apart so that their peripheral surfaces do not contact one with the other. Each treating brush may be mounted upon a shaft 11, which shaft at one side of the machine may be extended as at 12 to support a brush driving sprocket 13.

The drive means for the brushing machine may include an electric motor 14 supported upon frame 2 as by means of cross members 15 suitably mounted upon the longitudinal frame sills 16 carried by and bracing standards 3, 4 and 5. The motor may drive a countershaft 17 by means of motor pulley 18, belt 19, and countershaft pulley 20. The countershaft 17 may be journalled transversely of the frame by means of bearings 21 carried by the center standards 4. A jack shaft 22 may be driven from the countershaft by means of sprockets 23, 24 and chain 25. The jack shaft may be journalled directly above the countershaft in bearings 26 also carried by the center standards 4. Each of the treating brushes 8 may be operatively connected to the jack shaft 22 by means of the driving chain 27 playing over all of the brush driving sprockets 13 and the jack shaft sprocket 28. By this arrangement all of the brushes will be driven in the same direction of rotation and rotated at the same speed. It may be desirable to provide idler sprockets 29 and 30 on opposite sides of the driving sprocket 28, and also a chain tightening sprocket 31. The idler sprockets 29 and 30 may be journalled upon shafts 32 and 33 suitably supported from the machine frame, while the chain tightening sprocket may be adjustably mounted upon the frame for movement for tightening the chain to the proper tension.

The progressor mechanism 34 may be mounted above the treating brushes and may include a cradle 35 formed of a pair of suitable side rails 36 and 37 interconnected by a plurality of progressor bar pivot rods 38 equally spaced along the cradle at distances equal to the distances between the centers of the treating brushes 8. The cradle may be rockably mounted as by means of the spaced rocker shafts 39 and 40 journalled in the standards 41 and 42 respectively, mounted upon the side rails 6 and 7. Each rocker shaft may be provided with a pair of spaced rocker arms 43 and each rocker arm may be keyed to the rocker shaft so as to be rotated therewith. The free end of each rocker arm 43 may be pivotally connected to the cradle as by means of the pivot pin 44. By this arrangement each corner of the cradle is supported upon one of the rocker arms 43, and by giving one of the rocker shafts, shaft 40 in this case, an oscillatory motion, the cradle will be rocked or reciprocated back and forth, swinging freely upon the pivot pins 44.

The means for oscillating the rocker shaft 40, and thereby causing the rocking of the cradle, may include keying a lever arm 45 upon the extended end 46 of the rocker shaft, and connecting the free end 47 of the lever arm with a crank arm 48 as by means of the connecting rod 49. It should be noted that the throw of the crank arm is substantially less than the length of the lever arm 45, whereby a full rotation of the crank arm 48 will cause the lever arm 45 to oscillate back and forth. Crank arm 48 may be suitably mounted upon the drive shaft 50 journalled in bearings 51 carried by standards 3. The drive shaft 50 may be driven directly from the main countershaft 17, but in the preferred embodiment, a standard commercial form of speed change mechanism 52 may be interposed whereby the speed or rate of travel of the fruit through the treating machine, may be nicely regulated. The speed regulator may be operatively connected to drive shaft 50 by means of sprockets 53, 54 and chain 55, and to the main countershaft 17 by means of pulleys 56, 57, and belt 58.

A progressor bar 59 may be journalled upon each of the pivot rods 38, and each progressor bar may be provided with a plurality of relatively closely spaced fruit engaging members or fingers 60. The fingers 60 may be round rubber rods or a sheet of rubber or other suitable material may be provided in place of the rubber rods 60 for resiliently engaging and progressing the fruit through the machine. A stop pin 61 may be provided to limit the swinging action of the progressor bars 59 during the forward stroke of the cradle in order to retain the fruit engaging fingers in position to engage and push the fruit forwardly into the next succeeding trough. Upon the back stroke of the cradle the progressor bars 59 may swing away from stop pins 61, (note Fig. 4), as the fruit engaging fingers slide over the fruit, and finally as the fingers slide past the fruit, the progressor bars swing back into engagement with the stop pins ready for the next forward stroke.

A fruit feeding means 62 may be provided for delivering a row of fruit to the first of the treating brushes 8 for each cycle of operation of the progressor mechanism. The fruit feeding means may include a conveyor having relatively closely spaced transverse rollers 63 and arranged so as to convey a row of fruit in the valleys or troughs 64 formed between the rollers. The rollers may be carried between a pair of spaced chains 65 played around spaced sprockets 66 operatively mounted upon the drive shaft 67 which shaft may be journalled in suitable bearings upon the machine frame. It is important that the fruit feeding means 62 operate in timed relation with the progressor mechanism in order that a row of fruit may be delivered to the treating brushes for each cycle of operation of the progressor, and therefore, the fruit feeding means may be driven from the drive shaft 50 by means of sprockets 68, 69, and chain 70. The driving ratio between shaft 50 and shaft 67 should be such that for each revolution of shaft 50 the fruit feeding conveyor should be moved a distance sufficient to cause a row of fruit to discharge onto the treating brushes, and if desired, the conveyor may be timed so that a row of fruit will be delivered during the forward stroke of the progressor.

It should be noted that the drive means for progressor and the fruit feeding means are both taken from the drive shaft 50, which shaft is driven from the speed change mechanism 52, so that any change of progressor speed will correspondingly change the speed of the fruit feeding means, so that at no time will one be able to run ahead of the other.

The advantage of the speed change mechanism resides in providing means whereby the treating or abrading action on the fruit may be varied in accordance with the requirements of the fruit being treated, for example, apples which have become decidedly waxy with consequent impregnation of the spray residue, may require considerable abrasion, whereas delicate varieties of pears or other fruits may require very little abrasive action.

The operation of the machine may be briefly as follows: The motor 14 may be set into operation and the speed change mechanism 52 set for the duration of treatment necessary for the lot of fruit to be treated. Fruit may be then fed to the lower end of the fruit feed means 62 by any of the well-known means now in common use, and therefore not shown, whereby a row of fruit will be carried in the trough formed between the conveyor rollers 63. For each actuation of the progressor, the fruit feed means will be operated sufficiently to cause a row of fruit to be deposited upon the first of the treating brushes 8. Due to the rotation of the treating brushes 8, the row of deposited fruit will be carried forwardly and finally lodge in the trough formed between the first and second treating brushes. As all of the treating brushes are rotating at the same speed and in the same direction, the row of fruit lodged in the trough will be rolled over and over, and may substantially acquire the speed of the brushes. The fruit is treated or brushed by the fruit engaging the bristles of the brushes, and due to the lag in speed of the fruit with relation to the speed of the brushes, the brush bristles are wiped across the surface of the fruit. After the row of fruit has remained in the first trough for a suitable period, the progressor acts to boost or progress the row of fruit into the second trough, and so on until the fruit will have progressed through the entire machine. The action of the progressor may be briefly as follows: Upon the back stroke of the cradle the resilient fruit engaging fingers of the first progressor bar will engage and slide over the first row of fruit and finally after having completely passed over the fruit will assume a substantially vertical position back of the first row of fruit. As the resilient fingers are drawn over the fruit they lightly press the fruit into contact with the brushes, and also act to slow down the speed of the fruit, or in other words, increase the lag of the fruit and thus by weighting the fruit and increasing its lag, the abrading action of the brushes may be materially increased. Upon the forward stroke of the progressor, the resilient fruit engaging fingers carried by the first progressor bar, which are at the start of the forward stroke in back of the first row of fruit, will move forwardly to engage and gently boost or assist this first row of fruit from the first trough and with the assistance of the rotation of the second brush, the first row of fruit will be progressed into the second trough. In the same way, the fruit will be progressed from one trough to the next until the fruit is discharged from the machine.

As the progressor boosts the first row of fruit from the trough formed between the first and second treating brushes to the next trough, the fruit feed means may act to deposit another row of fruit onto the first treating brush to be carried thereby into the first trough, and so on until the entire lot of fruit has been treated.

By means of the progressor mechanism each piece of fruit whether large, small or oddly shaped, will be progressed through the treating machine at the same rate of travel and thus receive the same amount of treatment.

In some instances, it may be advisable to provide a run off board 71 arranged transversely of the machine and located between the discharge end of the fruit feeding means and the first fruit treating brush whereby the fruit delivered by the rollers of the fruit feed means will be guided onto the top surface of the first fruit treating brush and carried forward by this first treating brush into the first trough. Without the run off board 71, some fruit might remain in the space between the discharge end of the fruit feed means and the periphery of the first brush. It is desirable to position the run off board substantially tangentially with relation to the top of the first brush so as to insure that the fruit will pass immediately into the first trough.

However, a further and important feature of applicant's invention may now be pointed out, namely, in any fruit treating machine the matter of working capacity is often a factor in determining the value and scope of the device and, therefore, it is desirable to operate the machine at a relatively high rate of speed so as to attain a maximum number of strokes per minute of the progressor, especially during the peak of the fruit season.

A further and important feature of the invention results from the reciprocatory or oscillatory motion of the cradle whereby the cradle is brought to a full stop at the fruit engaging end of its motion from which point the cradle accelerates to substantially the mid point of its travel and therefrom may slow down until the opposite end of its travel has been reached. By this arrangement, even though the machine be driven at a relatively high speed, the fruit engaging means thereof will engage the fruit while moving at a relatively slow speed and will accelerate the same gradually, in other words, the fruit engaging means will be gently brought into engagement with fruit so as not to bruise or injure the same and then accelerating rapidly to transfer the fruit to the next trough. It will thus be seen that the velocity of contact or shock between the fruit engaging means and the fruit may be a minimum, even though the transfer or progression of the fruit be at a relatively high rate of speed.

There is an advantage in using the round rubber fruit engaging fingers 60 over the other forms of fruit engaging means, such as the sheet of rubber, even though the sheet be split into tongues or strips, for the following reasons: Any fruit treating device to be commercially successful must be capable of handling fruit without injury to the fruit even though the operator deliberately crowds or slugs the machine. Fruit treating machines are often deliberately and chronically slugged during the peak of the operating season. As the fruit contacting means, whether fingers or sheet, must be stiff enough to urge or boost the fruit forward and with the sheet, whether slit into strips or not, when given the required stiffness to boost the fruit along, will under slugged conditions during which the fruit may solidly pack the top surface of the brushes, filling not only the troughs, but completely covering the entire surface of the brushes, will obviously on their downward stroke jab directly onto specimens of fruit held in the solid layer below, thus causing undue pressure of the fruit against the brushes and causing injury directly to the fruit by the jab of the stiff sheets. Whereas, on the other hand, under the same conditions, the round rubber fingers when moving downwardly onto the fruit will slip sidewise around the contour thereof without directly damaging the fruit or causing the fruit to be damaged by forcing the same too severely against the treating brushes.

It may be desirable in some instances to arrange the cradle as illustrated in Figure 5 in order to permit the cradle to be reciprocated instead of rockably mounted upon the frame. In Figure 5 a portion of the frame is illustrated as at 72, which portion may form a trackway along which the rollers 73 may travel. The cradle 74 may be operatively mounted upon the rollers and may be reciprocated by a crank means 75 operatively carried by the frame and operatively connected to the cradle as by means of the connecting rod 76. The crank means 75 may be actuated by the same means as illustrated in Figures 1, 2 and 3.

Having fully described the invention, it is to be understood that it is not to be limited to the details herein set forth, but the invention is of the full scope of the appended claims.

I claim:

1. In a fruit treating machine, a frame, a plurality of cylindrical brushes journalled transversely of said frame, a drive means for said brushes, a progressor cradle rockably mounted upon said frame, a drive means operable for rocking said cradle, a plurality of progressor bars pivotally mounted upon said cradle, said progressor bars being spaced along the cradle at distances substantially equal to the spacing of the brushes, and resilient fruit engaging members carried by said progressor bars for engaging and progressing the fruit lodged in the troughs formed between the said cylindrical brushes.

2. A progressor mechanism for assisting the fruit out of the troughs formed between the transversely positioned treating brushes of a fruit treating machine including a frame, a progressor cradle rockably mounted in the frame, a drive means operative for rocking said cradle, and a plurality of progressor means operatively carried by said cradle and arranged to progress the fruit from one trough to the next during the forward stroke of the cradle, and to yieldingly slide over the fruit upon the back stroke of the cradle for decreasing the rate of rotation of the engaged fruit and to thereby increase the abrading effect of the brushes thereupon.

3. In a fruit treating machine, a frame, a plurality of cylindrical brushes journalled transversely of said frame, a drive means for said brushes, a progressor cradle rockably mounted in the frame, a plurality of progressor means operatively carried by said cradle and arranged to progress the fruit from one trough to the next during the forward stroke of the cradle and to yieldingly slide over the fruit upon the back stroke thereof to thereby hold the fruit in closer contact with the brushes for increasing the abrading action thereon, a fruit feed means and a drive means operative for synchronously rocking said cradle and actuating said fruit feed means.

4. In a fruit treating machine, a frame, a plurality of cylindrical brushes journalled transversely of said frame, a drive means for said brushes, a reciprocatory progressor cradle mounted upon said frame, a drive means operable for reciprocating said cradle, a plurality of progressor bars pivotally mounted upon said cradle, said progressor bars being spaced along the cradle at distances substantially equal to the spacing of the brushes, and resilient fruit engaging members carried by said progressor bars for engaging and progressing the fruit lodged in the troughs formed between the said cylindrical brushes.

5. A progressor mechanism for assisting the fruit out of the troughs formed between the transversely positioned treating brushes of a fruit treating machine including a frame, a progressor cradle mounted on said frame, a drive means operative for reciprocating said cradle, and a plurality of progressor means operatively carried by said cradle and arranged to progress the fruit from one trough to the next during the forward stroke of the cradle and positioned movably so as to yieldingly slide over the fruit upon the back stroke of the cradle for decreasing the rate of rotation of the engaged fruit and to thereby increase the abrading effect of the brushes thereupon.

FRANK W. CUTLER.